2,714,227
METHOD OF MAKING FRITTED GLASS TUBES

Paul N. W. Graham and Ellsworth G. Lamb, Corning, N. Y., assignors to Corning Glass Works, Corning, N. Y., a corporation of New York No Drawing. Application September 11, 1950,
Serial No. 184,351

4 Claims. (Cl. 18—59.2)

This invention relates to the manufacture of porous glass tubes having intercommunicating pores and especially suitable for use as filters.

Porous glass bodies containing intercommunicating pores can be produced by suitably molding a powdered glass having the requisite characteristics and then firing the resulting molded mass to sinter the powdered glass particles without completely fusing the same. Where substantially uniform pore size is desired, it is necessary to employ powdered glass having a substantially uniform grain size.

Porous glass tubes have been made in this manner by placing the powdered glass in a tubular metal mold provided with a tapered metal core, pressure being applied lengthwise of the mold, and then sintering the molded powdered glass. In the production of glass tubes of uniform pore size by this procedure, however, the molded powdered glass must be sintered in place in the mold because the molded tube does not possess sufficient green strength to be removed without breakage due to the necessity of using powdered glass of uniform particle size.

The formation of a tube having uniform pore size, moreover, requires substantially uniform compression of the powdered glass throughout the length of the mold. With increase in the length of the tube to be made or decrease in the size of the glass particles to be molded, it quickly becomes increasingly more difficult to obtain such uniform compression of the powdered glass. For these reasons, only relatively short uniform pore-size tubes (not more than several inches in length) can be satisfactorily made by this method—and then only in a relatively coarse pore size (on the order of 20 to 60 microns).

By slip casting powdered glass of substantially uniform particle size in the conventional manner in a porous mold, it is possible to obtain uniform pore size independent of the length of the tube to be made or the size of the pores desired. Other factors, however, render this procedure impracticable and unsatisfactory. For example, the slip-cast tube must be removed from the porous mold for sintering; but even though a split mold is used, the cast tube lacks sufficient green strength to permit removal whole unless a binder which will subsequently burn out, such as gelatin, is employed. However such binders burn out and the powdered glass falls apart before it starts to sinter. This lack of green strength, as in the pressure-molding method described above, is primarily due to the absence of varying-size particles which would otherwise bind the slip-cast powdered glass as an integral body.

We have now discovered a method of making porous glass tubes of uniform pore size whereby the above-mentioned difficulties are avoided and the indicated limitations are overcome. Our invention comprises essentially introducing a slip of a powdered glass having a substantially uniform grain size into an impervious tubular mold having a deformation temperature not less than the softening point of the powered glass and having on its inner surface a coating of a powdered refractory material which will not flux the powdered glass at the sintering temperature of the glass, rotating the mold about its longitudinal axis to deposit the powdered glass by centrifugal force in layer form on its inner surface and to remove suficient liquid from the slip by decantation or overflow from an end of the mold to enable the powdered glass layer to retain its shape, drying the powdered glass layer in place in the mold, and firing the dried powdered glass layer in place in the mold to sinter the same without complete fusion to form a coherent porous tube having intercommunicating pores and conforming to the shape of the mold but separable therefrom. Not only does such procedure permit the fabrication of porous glass tubes of considerably greater length than possible heretofore, but it also becomes possible to produce such tubes in a wide variety of pore sizes (from as fine as on the order of 0.9 micron or less to as coarse as on the order of 60 microns or greater).

The successful practice of this invention is dependent upon the following considerations:

The tubular mold must not soften or deform at temperatures below the sintering temperature of the powdered glass. Although the mold may be made of metal, it is preferably composed of a glass having a softening point not less than that of the powdered glass and an expansion coefficient substantially the same as that of the powdered glass. Moreover, the mold should be free from internal irregularities which might prevent removal of the sintered porous tube.

The coating of powdered refractory material on the inner surface of the mold is essential in order to prevent adherence of the porous glass tube to the mold during firing. Any refractory material which will not react with or flux the powdered glass at the temperature of firing may be used, such as for example, $SiO_2$, $Al_2O_3$, MgO, $ZrO_2$, $SnO_2$, $ZrSiO_4$, $CaCO_3$, $MgCO_3$ and various minerals including mullite, sillimanite, bauxite and corundum. Silica, being the major constituent of most commercial glasses, is less objectionable as a contaminant than other materials and is to be preferred where the porous tube is to be made from such a glass. Thick coatings tend to flake off during deposition of the powdered glass from the slip and, for best results, the coating preferably should not exceed about 1/32 inch in thickness.

The coating may easily be applied by introducing the powdered refractory material as a suspension or slip into the tubular mold and revolving the mold to spread the slip uniformly over its inner surface. The coating is then desirably allowed to dry before use. To insure adherence of the powdered refractory material to the inner surface of the mold, it is advantageous to suspend the refractory material in a binding liquid such as thickened turpentine or a lacquer. For additional protection against flaking, the dried coating may, if desired, be covered with paraffin.

For casting the slip of powdered glass, the tubular mold may be provided at each end with a removable stopper having an aperture through which the liquid of the slip can escape as the powdered glass is deposited on the inner surface of the mold by centrifugal force. The mold may be rotated about its longitudinal axis by clamping one end thereof in the chuck of a lathe and turning it at a high speed, for example, 2500 R. P. M. After the bulk of the liquid has escaped from the mold, a current of air may be passed through the revolving mold to further the removal of sufficient liquid to enable the cast tubular layer to retain its shape.

The cast tube is then dried and sintered in place in the mold in a furnace, the temperature of which is raised from room temperature at a rate sufficiently slow to avoid too rapid evolution of moisture or volatile material which might cause spalling of the cast powdered glass. Good results are obtained by heating at a rate of about 50° C. per ½ hour to 300° C., after which the temperature may be raised more rapidly to the sintering temperature or softening point of the powdered glass. The exact time to effect the necessary partial fusion may readily be determined by trial, but in general about 10 minutes at the sintering temperature is sufficient. The cast tube shrinks sufficiently during firing so that it is readily separable from the mold without damage.

In order to insure no flattening or warping of the porous glass tube during sintering, it is advantageously supported in its mold in the furnace between two horizontally disposed rotating rolls which cause it to turn slowly while being sintered. Alternatively, the mold containing the cast tube, after preliminary heating, may be inserted in a long, rotating, closed-end refractory tube in a molten salt bath for uniform heating during sintering of the tube.

The pore size of the finished tube depends on the particle size of the powdered glass, which may be suitably graded by screening and settling from water in known manner. For instance, powdered glass suitable for making a porous tube having a maximum pore diameter between 0.9 and 1.8 microns may be prepared by ball-milling a wet batch comprising water and about 87% by weight of glass crushed to pass through a screen having 12 meshes per linear inch for about 24 hours. The resulting slurry is passed through a magnetic separator to remove any iron and then after dilution with more water is allowed to settle for one hour. The supernatant liquid is decanted and allowed to settle for 24 hours. After decantation of the supernatant liquid, the settled material can be made into a slip by stirring it into water.

Constant stirring of the prepared slip to prevent settling of the powdered glass prior to its introduction into the mold is necessary. To aid against such settling and to provide a temporary bond and prevent too rapid drying of the powdered glass, the liquid of the slip may advantageously comprise an aqueous solution of about 15% by weight of glycerine. If desired, a small amount, say 0.2%, of a wetting agent, such as a sulfonated hydrocarbon may be included in the slip to prevent entrapment of air bubbles on the surface of the mold. An anti-foaming agent may also be used to reduce any tendency of the slip to foam while being stirred.

Porous glass tubes made by the present method have high mechanical strength and can readily be joined by sealing with laboratory or other apparatus made of glass.

We claim:

1. The method of making a porous glass tube, which comprises introducing a slip of a powdered glass having a substantially uniform grain size into an impervious tubular glass mold having a deformation temperature not less than the softening point of the powdered glass and having on its inner surface a coating of a powdered refractory material which differs from and will not flux the powdered glass at the sintering temperature of the glass, rotating the mold about its longitudinal axis to deposit the powdered glass by centrifugal force in layer form on its inner surface and to remove sufficient liquid from the slip by decantation or overflow from an end of the mold to enable the powdered glass layer to retain its shape, drying the powdered glass layer in place in the mold, and firing the dried powdered glass layer in a furnace while in the mold to sinter the powdered glass without complete fusion to form a coherent porous tube having intercommunicating pores and conforming to the shape of the mold but separable therefrom.

2. The method according to claim 1 in which the powdered refractory material comprises silica.

3. The method of making a porous glass tube, which comprises introducing a slip of a powdered glass having a substantially uniform grain size into an impervious tubular glass mold having a softening point not less than that of the powdered glass and an expansion coefficient substantially the same as that of the powdered glass and having on its inner surface a coating of powdered silica, rotating the mold about its longitudinal axis to deposit the powdered glass by centrifugal force in layer form on its inner surface and to remove sufficient liquid from the slip by decantation or overflow from an end of the mold to enable the powdered glass layer to retain its shape, drying the powdered glass layer in place in the mold, and firing the dried powdered glass layer in place in the mold to sinter the same without complete fusion to form a coherent porous tube having intercommunicating pores and conforming to the shape of the mold but separable therefrom.

4. The method of making a porous glass tube, which comprises introducing a slip of a powdered glass having a substantially uniform grain size into an impervious tubular glass mold having a softening point not less than that of the powdered glass and an expansion coefficient substantially the same as that of the powdered glass and having on its inner surface a coating of a powdered refractory material which differs from and will not flux the powdered glass at the sintering temperature of the glass, rotating the mold about its longitudinal axis to deposit the powdered glass by centrifugal force in layer form on its inner surface and to remove sufficient liquid from the slip by decantation or overflow from an end of the mold to enable the powdered glass layer to retain its shape, drying the powdered glass layer in place in the mold, and firing the dried powdered glass layer in place in the mold to sinter the same without complete fusion to form a coherent porous tube having intercommunicating pores and conforming to the shape of the mold but separable therefrom.

References Cited in the file of this patent

UNITED STATES PATENTS

| | | |
|---|---|---|
| 1,051,638 | Rodman | Jan. 28, 1913 |
| 1,474,432 | Gimson | Nov. 20, 1923 |
| 2,125,912 | George et al. | Aug. 9, 1938 |
| 2,208,034 | Korach et al. | July 16, 1940 |
| 2,314,824 | Greene | Mar. 23, 1943 |

FOREIGN PATENTS

| | | |
|---|---|---|
| 330,943 | Great Britain | June 20, 1930 |

OTHER REFERENCES

Encyclopedia of the Ceramic Industries, Searle. publ. by Ernest Benn, Ltd., London 1929, vol. 1, page 184, "Centrifugal Separator".